United States Patent [19]

Wortman

[11] Patent Number: 4,663,580
[45] Date of Patent: May 5, 1987

[54] SEALED LEAD-ACID BATTERY FLOAT CHARGER AND POWER SUPPLY

[75] Inventor: Donald W. Wortman, Broken Arrow, Okla.

[73] Assignee: Seiscor Technologies, Inc., Tulsa, Okla.

[21] Appl. No.: 817,323

[22] Filed: Jan. 9, 1986

[51] Int. Cl.⁴ .............................................. H02J 7/04
[52] U.S. Cl. ........................................ 320/35; 320/40; 323/293; 323/369; 323/907
[58] Field of Search ...................... 320/35, 36, 39, 40; 323/293, 369, 907

[56] References Cited

U.S. PATENT DOCUMENTS

| | | | |
|---|---|---|---|
| 3,453,518 | 7/1969 | Rose et al. | 320/35 |
| 4,352,056 | 9/1982 | Cave et al. | 323/907 |
| 4,368,420 | 1/1983 | Kuo | 323/907 |

Primary Examiner—Patrick R. Salce
Assistant Examiner—Anita M. Ault
Attorney, Agent, or Firm—David J. Thibodeau, Jr.; Richard M. Sharkansky; Scott W. McClellan

[57] ABSTRACT

A power supply is provided with a predetermined nonlinear temperature coefficient for float charging sealed lead-acid batteries and providing power to a load. A temperature compensation network in the power supply provides the predetermined nonlinear temperature coefficient by using a linear temperature coefficient element (forward biased silicon diode) and a nonlinear temperature coefficient element (thermistor) in combination. Additionally, an over-voltage protection circuit, to disable the power supply should the output voltage exceed a predetermined value, is disclosed having a second temperature compensation network to compensate for the output voltage variation with temperature of the power supply.

14 Claims, 4 Drawing Figures

SEALED LEAD-ACID BATTERY FLOAT CHARGER AND POWER SUPPLY

BACKGROUND OF THE INVENTION

This invention relates to combination battery chargers and power supplies, and more particularly to battery chargers which vary the output voltage with temperature.

In outdoor electronic system installations, e.g., outside plant telecommunications equipment, batteries are often used to provide needed power in the event that local primary power (A.C.) to that installation fails. These batteries must provide power to the installation over wide temperature extremes for a predetermined period of time, typically eight hours. At low temperatures, battery capacity is severely diminished. For example, unsealed lead-acid (secondary) batteries only have 50% capacity at −20° C. (relative to the capacity of the battery at 20° C.). A new type of battery, a sealed lead-acid battery having pure lead electrodes, hereinafter referred to as a sealed lead-acid battery, as manufactured by Gates Energy Products, Inc., Denver, Colorado, has additional capacity at low temperatures, typically 50% at −40° C. While this battery allows operation of the electronic equipment at low temperatures, a widely varying charge (float) voltage is needed to recharge the battery. For example, at −40° C., 67 volts is needed to maintain a charge on the batteries, but at 25° C., the float voltage falls to 56 volts. Additionally, the float voltage does not vary linearly with temperature, i.e., the temperature coefficient of the required float voltage is not constant but varies with temperature. Using a constant float voltage designed to charge the battery at 25° C. (the power supply having no temperature coefficient) the battery life is shortened due to the battery being overcharged at high temperatures and undercharged at low temperatures. To overcome the nonlinear float voltage variation with temperature characteristics, two approaches are used in the prior art: constant current charging and "gear shift" charging. Constant current "trickle" charging charges the batteries by keeping a low charging current flowing into the battery regardless of the temperature or battery float voltage. Although the temperature dependence of the float voltage is overcome with this approach, very long periods are required to recharge a depleted battery. Therefore, if the battery is called upon to provide power during this charging interval, full capacity would not be available and the installation may not be powered for the full predetermined period. This is especially critical in areas having an unreliable primary power source. The "gear shift" charging approach switches from a high charge current to a low charge current if a predetermined rate of change of the battery voltage is exceeded regardless of temperature. With this approach, the time period required to charge the battery is reduced, but this reduced time period is far from optimal for the quickest recharge while having long battery life. In addition, constant current and "gear shift" type power supplies are unsuitable for powering loads with widely varying power requirements due to wide voltage fluctuations across the load.

SUMMARY OF THE INVENTION

It is therefore an object of this invention to provide a means for optimally charging a battery by determining the float voltage required versus temperature over the operating temperature range of the battery.

A further object of this invention is to provide a power supply having an output voltage which changes with temperature to match the required float voltage of the battery and to have the power supply shutdown if the output voltage exceeds a predetermined value, that predetermined value tracking the float voltage of the battery.

These objects and other objects are achieved by having a power supply with an internal voltage regulator being responsive to a temperature compensation network which varies the power supply output voltage with temperature. The variation in the output voltage with temperature (temperature coefficient) matches the required float voltage of sealed lead-acid cells. This network combines a linear temperature coefficient of a forward biased silicon diode and a nonlinear temperature coefficient of a thermistor to match the temperature coefficient of the sealed lead-acid batteries. Further, an additional temperature compensation network is used to offset the output voltage variation with temperature of the output voltage to provide a constant voltage used for over-voltage shutdown of the power supply.

BRIEF DESCRIPTION OF THE DRAWINGS

The foregoing features of this invention, as well as the invention itself, may be more fully understood from the following detailed description of the drawings, as filed.

DESCRIPTION OF THE PREFERRED EMBODIMENT

Figure 1:
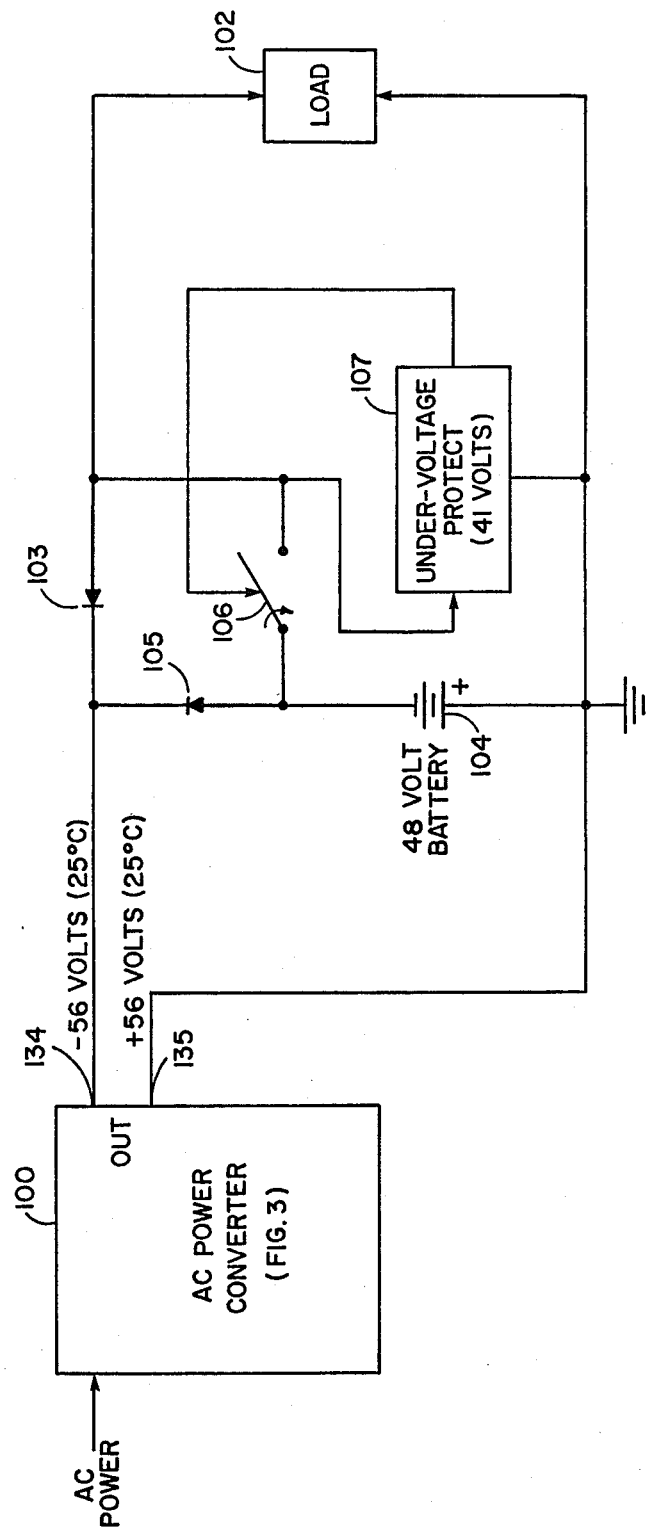
FIG. 1 is a diagram of a power supply system.

Referring to FIG. 1, a power supply system is diagrammed. Alternating current (AC) power is fed to AC power converter 100 which transforms the AC power to a regulated direct current (DC) voltage, here 56 volts at 25° C., to output lines 134 and 135. This voltage provides power to load 102 via diode 103. The AC power converter 100 also provides power to battery 104 via diode 105 to charge the battery 104. Should the AC power fail, battery 104 provides power to the load 102 via switch 106. Undervoltage protector 107 releases switch 106 when the voltage delivered to the load 102 falls below 41 volts, indicating that the battery 104 is discharged. This prevents damaging the battery 104 by over-discharge. Once AC power is restored, battery 104 begins recharging and undervoltage protector 107 closes switch 106. Output from the AC power converter 100, shown here as 56 volts at 25° C., provides a float voltage to battery 104. This maintains battery 104 at full charge during normal operation. However, at temperatures other than 25° C., the required float voltage changes.

Figure 2:
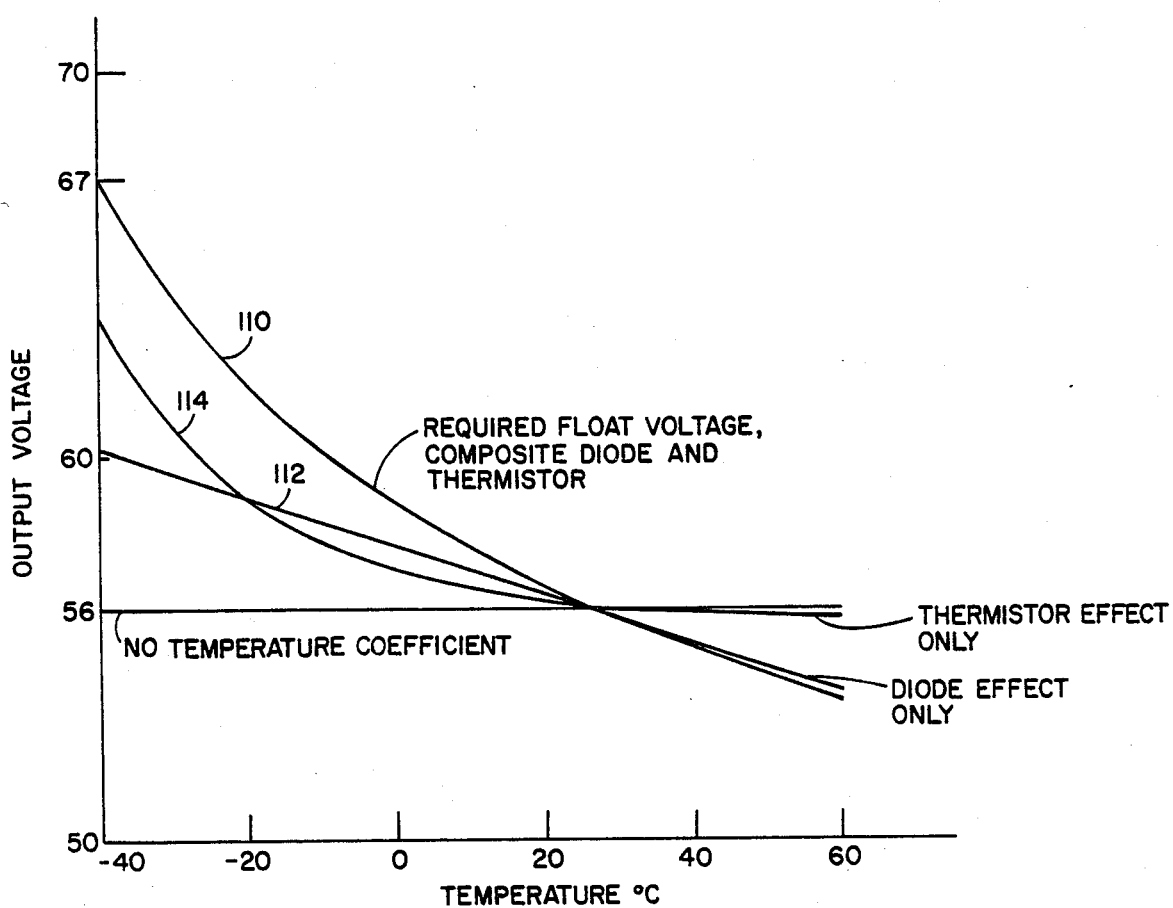
FIG. 2 is a graph of the output voltage variation with temperature of the power supply system.

FIG. 2 is a graph of the required float voltage curve 110 versus temperature of the battery 104 (FIG. 1). As shown, the required float voltage curve 110 is nonlinear with temperature. Therefore, the output voltage of the AC power converter 100 (FIG. 1) must vary with temperature (tracking curve 110) to maintain a full charge in the battery 104 (FIG. 1).

Figure 3:
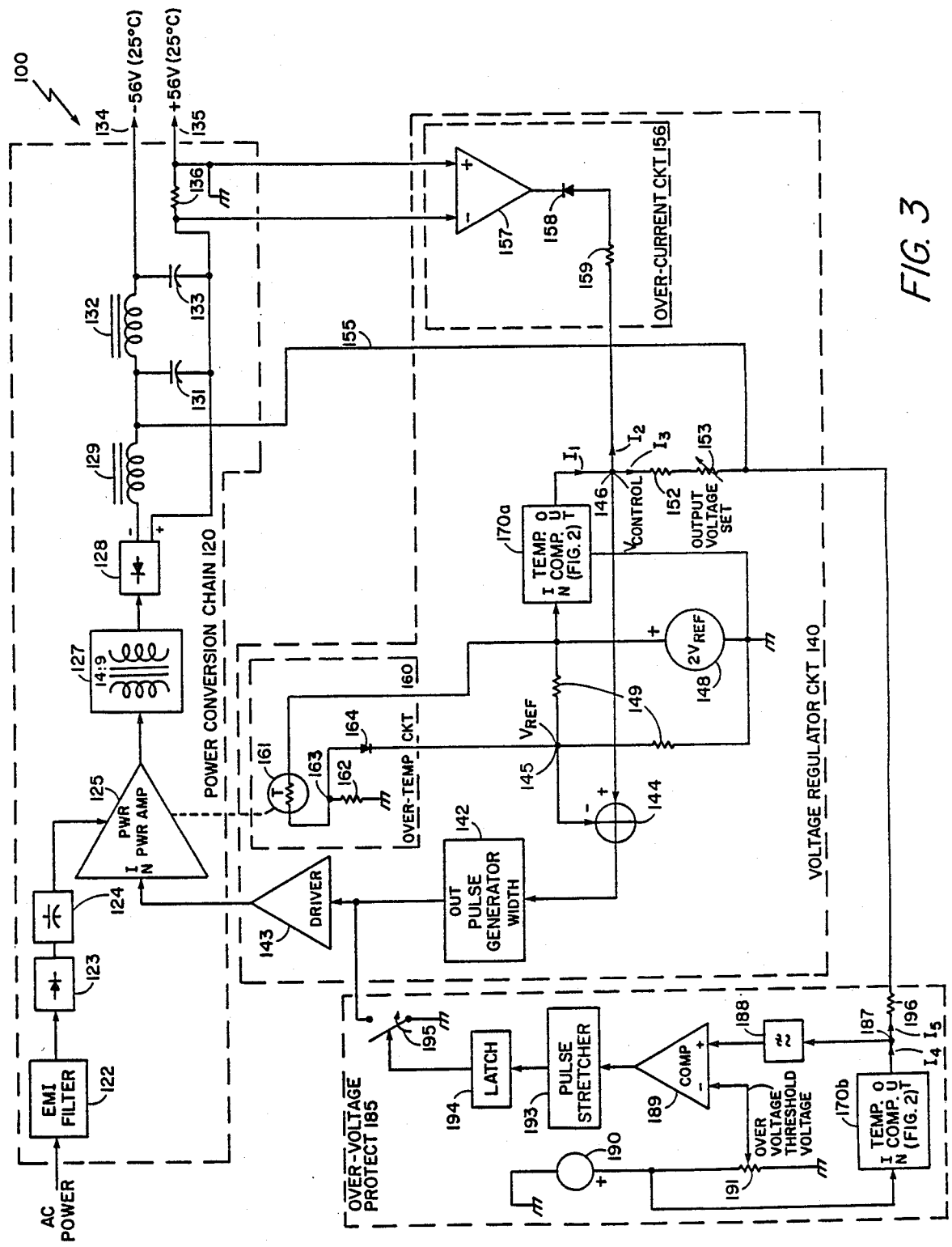
FIG. 3 is a block diagram of the A.C. power converter of the power supply system.

FIG. 3 diagrams the AC power converter 100, commonly known as a switching power converter. AC power enters the power conversion chain 120 via electromagnetic interference (EMI) filter 122. The filtered AC power is then converted to a DC voltage by rectifier 123 and the DC voltage is filtered by capacitor filter 124 for presentation to power amplifier 125. Power amplifier 125 amplifies pulses generated by voltage regulator circuit 140. Amplified pulses from power amplifier 125 couple to transformer 127 to provide isolation and to step down the voltage of the amplified pulses from power amplifier 125 by a 14 to 9 ratio. Rectifier 128 rectifies the stepped down pulses and inductor 129 stores energy from the rectified stepped-down pulses for utilization between pulses. Output from inductor 129 is filtered by capacitor 131, inductor 132 and capacitor 133 to provide a smooth DC output voltage to negative output line 134. The DC output voltage on line 134 is proportional to the pulse width of the pulses coupled to the power amplifier 125. Positive output line 135 is coupled to common (not numbered) and returns to the positive output of the rectifier 128 via resistor 136. Resistor 136, having a very low resistance, is used to determine output current from the AC power converter 100. Voltage regulator circuit 140 provides pulses of variable width at a constant frequency, here 120 KHz, to the power amplifier 125. Pulse generator 142 in voltage regulator circuit 140 generates those pulses. The pulse width of the pulses is varied by the width control input to the pulse generator 142. The pulses are amplified by driver 143 for driving power amplifier 125. Regulation of the DC output voltage from the AC power converter is accomplished by comparing a DC sense voltage on line 155 (having substantially the same voltage as the output voltage on line 134), to a reference voltage and varying the pulse width of the pulse from the pulse generator 142 accordingly. If the sense voltage on line 155 is too low, the pulse width is increased and if the sense voltage is too high, the pulse width is reduced. Subtractor 144 compares the reference voltage on node 145 to a control voltage on node 146 by subtracting the reference voltage from the control voltage. The control voltage on node 146 is proportional to the sense voltage on line 155. At normal operating temperatures of the power amplifier 125 and resistors 149 being of equal value, the reference voltage on node 145 is one-half the voltage of temperature invariant reference voltage source 148. Over-temperature circuit 160 raises the reference voltage on node 145 if the temperature of the power amplifier 125 exceeds a predetermined temperature. This protects the power amplifier 125 from damage by reducing the pulse width of pulses fed to the power amplifier 125 and hence reducing the output power of power amplifier 125. Thermistor 161, thermally coupled to power amplifier 125, lowers its resistance with increasing temperature causing the voltage on node 163 to increase. Once that voltage exceeds the reference voltage on node 145 (one-half the voltage from voltage source 148) by the turn-on voltage of diode 164, the voltage on node 145 increases, increasing the voltage on the negative input of the subtractor 144. This in effect reduces the input to pulse generator 142 to thereby reduce the pulse width of the pulses generated therein protecting the power amplifier 125 from damage by overheating. Since the algebraic sum of the currents entering node 146 is zero and neglecting any small current flowing into the positive input of the subtractor 144 from node 146, then $I_1 = I_3 + I_2$. Over-current circuit 156 will be described in detail below, but it is sufficient to state here that at excessive output current from a converter 100, over-current circuit 156 limits the output current by varying current $I_2$ from node 146. At low output current, over-current circuit 156 keeps $I_2$ at zero. Current $I_3$ is set by resistor 152 and potentiometer 153 dropping the sense voltage on line 155 to the control voltage on node 146. Current $I_1$ is generated in temperature compensation network 170a, which will be discussed in detail below, but it is sufficient to state here that $I_1$ varies with temperature in such a way that the output voltage of converter 100 (on lines 155 and 134) matches curve 110 (FIG. 2). Assuming here that $I_1$ is constant with temperature and $I_2$ is zero, then $I_3 = I_1$. As the sense voltage on line 155 goes more negative (as does negative output line 134), the control voltage on node 146 becomes more negative so that the output of subtractor 144 decreases, causing the pulse generator 142 to decrease the pulse width of the pulses amplified by power amplifier 125. These smaller pulse widths reduce (make less negative) the output voltage so that the output voltage is held constant. Conversely, if the voltage on line 155 should become less negative, the control voltage on node 146 becomes less negative and, hence, the output of subtractor 144 increases. This increase causes pulse generator 142 to increase the pulse width of pulses amplified by pulse amplifier 125, which in turn causes the sense voltage on line 155 to become more negative as does the output voltage on line 134. Equilibrium occurs when the control voltage on node 146 equals the reference voltage on node 145. Over-current circuit 156 limits the output of AC power converter 100 to protect the converter 100 from damage in case of excessive current consumption (short circuit, etc.). At low output current from the AC power converter 100, the voltage drop across resistor 136 is essentially zero and the output of amplifier 157 is essentially zero. Diode 158 inhibits current $I_2$ from flowing from node 146 through resistor 159. Should the output current exceed a predetermined value, a positive voltage will occur across resistor 136 causing the output of amplifier 157 to exceed the voltage on node 146 by the forward voltage drop of diode 158 and current $I_2$ begins to increase. With $I_1$ constant and $I_3 = I_1 - I_2$, $I_3$ will decrease, lowering the voltage drop across resistor 152 and potentiometer 153. Therefore, the control voltage becomes more negative as if the sense voltage on line 155 went too negative, causing the converter 100 to reduce the output voltage on line 134 below the desired voltage in an effort to reduce current consumption. The gain amplifier 157 and the value of resistor 159 is chosen such that once the output current exceeds the predetermined value, the AC power converter 100 acts like a constant current supply, i.e., the output current is constant regardless of the impedance of the load and the output voltage of the converter 100. Over-voltage protect circuit 185 shuts down the AC power converter 100 should the sense voltage on line 155 exceed a predetermined voltage. The voltage on node 187, proportional to the sense voltage on lead 155, passes through low pass filter 188 to the positive input on comparator 189. A threshold voltage, derived from thermally stabilized voltage source 190, is scaled by potentiometer 191, and coupled to the negative input of comparator 189. Output of comparator 189 is coupled to pulse stretcher 193 which in turn drives latch 194. Latch 194 controls normally open switch 195. Should the voltage coupled to the positive input of comparator 189 exceed the threshold voltage, the output of the comparator becomes active, triggering the pulse stretcher 193 to produce a pulse long enough to guarantee that latch 194 is set. Once latch 194 is set, switch 195 closes shorting-out the output of pulse generator 142, thereby inhibiting pulses from the pulse generator 142 from reaching power amplifier 125 causing the output voltage to fall to zero. The latch 194 is reset only when the AC power is removed and then restored. The currents $I_4$ and $I_5$ flowing through node 187 are equal (neglecting any small steady state currents flowing from node 187 to filter 188). Current $I_4$, from temperature compensation network 170b, varies with temperature, as described below, but it is sufficient to state here that the network 170b operates essentially the same as the network 170a and the current $I_4$ tracks the current $I_1$ with temperature. Since $I_5$ equals $I_4$, variations in $I_4$ with temperature causes the voltage drop across resistor 196 to vary opposite to variations in sense voltage on line 155. This nulls out the sense voltage variation on line 155 with temperature caused by temperature compensation network 170a to provide a constant voltage (with temperature) on node 187. This allows comparator 189 to compare the constant voltage on node 187 via filter 188 against the threshold voltage from potentiometer 191.

Figure 4:
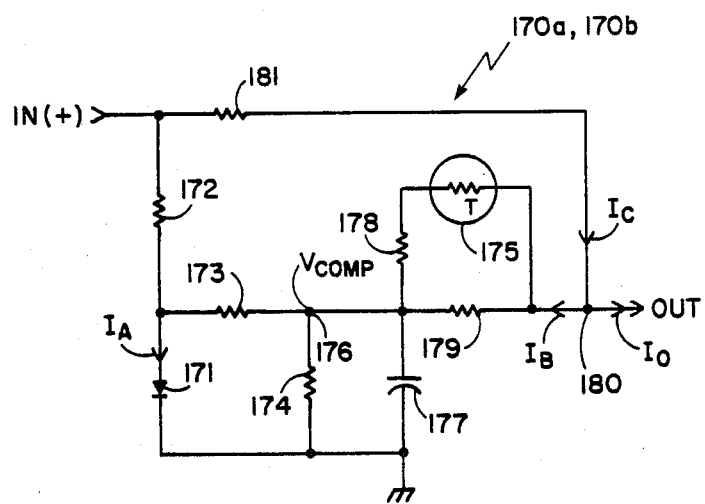
FIG. 4 is a schematic diagram of the temperature compensation network.

FIG. 4 diagrams the temperature compensation network 170a, 170b (FIG. 3). Diode 171 has a linear temperature coefficient and thermistor 175 has a nonlinear temperature coefficient. The combination of both the linear and nonlinear temperature coefficients in temperature compensation network 170a (FIG. 3) allows AC power converter 100 (FIG. 1) to produce the required float voltage as shown by curve 110 (FIG. 2). Referring temporarily to FIG. 2, curve 112 plots the output voltage of the converter 100 in response to the linear temperature coefficient of the diode 171 (FIG. 4) alone with temperature, here a silicon diode of type 1N4148. Curve 114 plots the output voltage of the converter 100 in response to the nonlinear inverse temperature coefficient of the thermistor 175 (FIG. 4) alone with temperature, here a thermistor type LA 27J1, made by Fenwal Electronics of Framingham, Massachusetts. The combination of curve 112 and curve 114 yields the desired curve 110. Returning to FIG. 4, the input voltage is supplied by a temperature invariant voltage source, such as source 148 or source 190 (FIG. 3). Resistor 172 sets the forward current $I_4$ of diode 171 to achieve the desired temperature coefficient of $-2.0$ mV/C°, here $I_A$ is about 2 ma. Resistors 173 and 174 scale the diode temperature coefficient to produce the voltage $V_{COMP}$ on node 176. Capacitor 177 filters out any noise generated by diode 171. Thermistor 175 in series with resistor 178 parallels resistor 179 to adjust the current $I_B$, resistors 178 and 179 scaling the nonlinear temperature coefficient of thermistor 175. Current $I_C$ into node 180 is set by resistor 181 dropping the input voltage to the voltage on node 180. Since the algebraic sum of the currents into node 180 is zero, then the output current $I_O = I_C - I_B$, wherein the output current $I_O$ corresponds to current $I_1$ in the voltage regulator circuit 140 (FIG. 3) and to current $I_4$ in the over-voltage protection circuit 185 (FIG. 3). It is noted that any changes in current $I_C$ can be ignored since the voltage on node 180 is constant due to the voltage regulation by converter 100 in equilibrium holding node 146 (FIG. 3) at a constant voltage. Additionally, the voltage on node 187 (FIG. 3), as noted above, does not vary with temperature since temperature compensation network 170b nulls out any voltage variation on node 187 due to temperature compensation network 170a. Therefore, with increasing temperature, the voltage on node 176 decreases linearly with temperature (in response to diode 171) and the combined resistance of thermistor 175 and resistors 178, 179 decreases nonlinearly as to increase $I_B$, which causes $I_O$ to decrease. Conversely, with decreasing temperature, the voltage on node 176 increases linearly and the combined resistances of thermistor 175 and resistors 178, 179 increases nonlinearly as to decrease $I_B$, causing $I_O$ to increase. Referring back to the voltage regulator circuit 140 of FIG. 3 and noting that $I_O$ (FIG. 4) corresponds to $I_1$, increasing temperature decreases $I_1$ causing the control voltage on node 146 to decrease, thereby decreasing the output voltage on line 134. Increasing temperature increases $I_1$ which causes the control voltage on node 146 to increase, thereby increasing the output voltage on line 134. This change in output voltage with temperature on line 134 corresponds to the curve 110 (FIG. 2). Also referring to the over-voltage protect circuit 185 in FIG. 3, and noting that $I_4$ corresponds to $I_O$ (FIG. 4), the current $I_4$ also changes with temperature, similar to the process described above, causing the over-voltage protection circuit 185 to compensate the sense voltage change on line 155 with temperature so that the voltage on node 187 is constant with temperature. This allows a fixed threshold voltage (on negative input to comparator 189) to be used as the over-voltage threshold regardless of temperature.

Having described a preferred embodiment of the invention, it will now be apparent to one of skill in the art that other embodiments incorporating its concept may be used. It is felt, therefore, that this invention should not be limited to the disclosed embodiment, but rather should be limited only by the spirit and scope of the appended claims.

What is claimed is:

1. In a voltage regulator for providing a regulated output voltage at an output terminal, a temperature compensation network means coupled to a voltage supply for varying the output voltage with temperature as the voltage supply operates over a predetermined range of temperature, the temperature compensation network means comprising:

first means, coupled to the voltage supply, for producing a first signal which varies linearly over the predetermined range of temperature;

second means, coupled to the voltage supply, for producing a second signal which varies nonlinearly over the predetermined range of temperature; and means for combining the first signal and second signal to provide the regulated output voltage at the output terminal.

2. Apparatus as recited in claim 1, wherein the first means comprises a diode and the second means comprises a thermistor.

3. In a voltage regulator for providing a regulated output voltage, a temperature compensation network means, coupled to a voltage supply, for varying the output voltage nonlinearly with variations in temperature, the temperature compensation network means comprising:

voltage source means, coupled to the voltage supply, for providing a voltage varying linearly with temperature; and nonlinear temperature compensation network means, coupled to the voltage source means, for providing the regulated output voltage.

4. Apparatus as recited in claim 3 wherein the voltage source means comprises a forward biased diode and the nonlinear temperature compensation network means comprises a thermistor.

5. A power supply, providing a regulated output voltage, the output voltage having a predetermined nonlinear temperature coefficient, comprising:
(a) a voltage regulator;
(b) a first temperature compensation network, coupled to the voltage regulator, including:
 (i) a forward biased diode having a linear temperature coefficient; and
 (ii) a thermistor, coupled to the forward biased diode;
(c) a second temperature compensation network having essentially the same characteristics as the first temperature compensation network, for compensating for the predetermined nonlinear temperature coefficient of the output voltage, to provide a constant voltage; and
(d) protection means, responsive to the output voltage of the power supply and the constant voltage from the second temperature compensation network, for disabling the power supply should the output voltage exceed a predetermined value.

6. A temperature compensation circuit, fed by a reference voltage and providing an output voltage, the output voltage changing with temperature over a range of temperatures to vary in accordance with a desired voltage for charging a battery as the battery operates over the range of temperatures, comprising:
means, fed by the reference voltage, for providing a linearly varying voltage, such voltage linearly decreasing with increasing temperature over the range of temperatures;
means, fed by the reference voltage, for providing a nonlinearly varying voltage, such voltage nonlinearly decreasing with increasing temperature over the range of temperatures; and
means, fed by the linearly varying voltage and the nonlinearly varying voltage, for combining the linearly varying voltage and the nonlinearly varying voltage, and providing the output voltage.

7. Apparatus as in claim 6 wherein the linearly varying voltage providing means comprises a diode.

8. Apparatus as in claim 7 and further comprising: a filter coupled to the diode.

9. Apparatus as in claim 6 wherein the nonlinearly varying voltage providing means comprises a thermistor.

10. Apparatus as in claim 6, and further comprising:
means, disposed between the linearly varying voltage providing means and the combining means, for scaling the linearly varying voltage.

11. Apparatus as in claim 6, and further comprising:
means, disposed between the nonlinearly varying voltage providing means and the combining means, for scaling the nonlinearly varying voltage.

12. Apparatus as in claim 6 wherein the reference voltage is provided by a variable power converter and further comprising:
means for providing a thermally stabilized threshold voltage;
second temperature compensation means, fed by the thermally stabilized threshold voltage, for generating a temperature compensated voltage; and
disabling means, fed by the output voltage, the thermally stabilized threshold voltage and the temperature compensated voltage, for disabling the variable power converter when the difference between the temperature compensated voltage and the output voltage exceeds the thermally stabilized threshold voltage.

13. Apparatus as in claim 12 wherein the disabling means comprises:
a resistor, fed by the output voltage and the temperature compensated voltage, and providing a constant-with-temperature sense voltage;
means, fed by the constant-with-temperature sense voltage, for providing a filtered sense voltage;
comparator means, fed by the thermally stabilized threshold voltage and the filtered sense voltage, for providing a disable signal, the disable signal having an active state and a passive state, the disable signal remaining in the passive state normally and entering the active state when the filtered sense voltage exceeds the thermally stabilized threshold voltage; and
switch means, fed by the disable signal and coupled to the variable power converter, for disabling the variable power converter when the disable signal is in the active state.

14. A temperature compensation circuit, fed by a reference voltage and providing an output voltage, such output voltage changing over a range of temperatures to match a desired voltage used to charge a battery, comprising:
means, including a forward biased diode fed by the reference voltage, for providing a voltage decreasing linearly as temperature increases over the range of temperatures;
first resistor divider network means, fed by the voltage decreasing linearly as temperature increases, for varying voltage providing a scaled linearly varying voltage;
means, including a capacitor, fed by the scaled linearly varying voltage, for providing a filtered linearly varying voltage;
means, including a thermistor, fed by the reference voltage, for providing a voltage decreasing nonlinearly as temperature increases over the range of temperatures;
second resistor divider network means, fed by the voltage decreasing nonlinearly as temperature increases, for providing a scaled nonlinearly varying voltage; and
summing means, fed by the filtered linearly varying voltage and the scaled nonlinearly varying voltage, for providing the output voltage changing with temperature to match the desired voltage.

* * * * *